Nov. 27, 1951            D. B. KOSER           2,576,719
GAS BURNING AIR AND WATER HEATING
FURNACE WITH THERMOSTATIC CONTROL
Filed Jan. 21, 1947                                     3 Sheets-Sheet 1
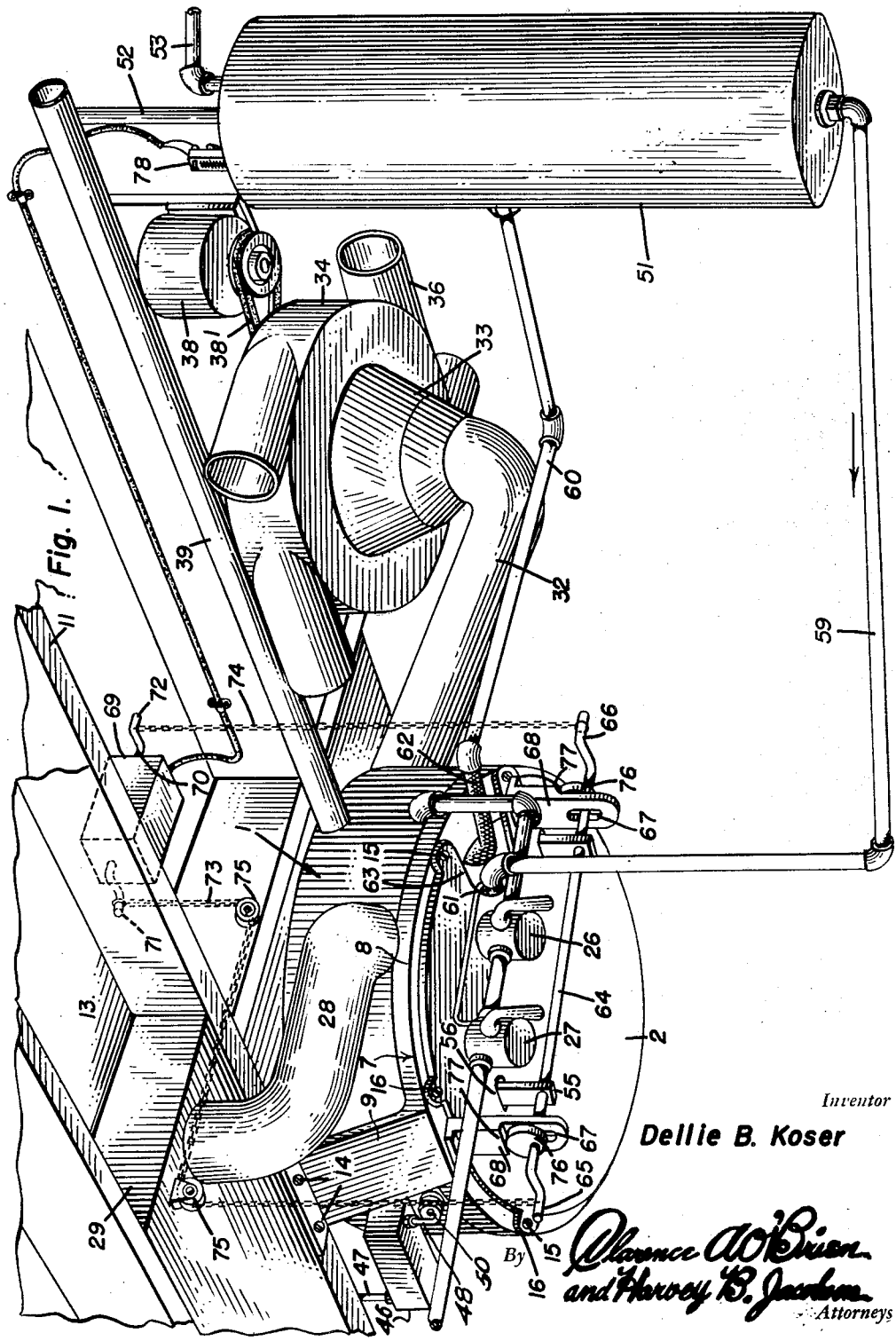
Inventor
Dellie B. Koser

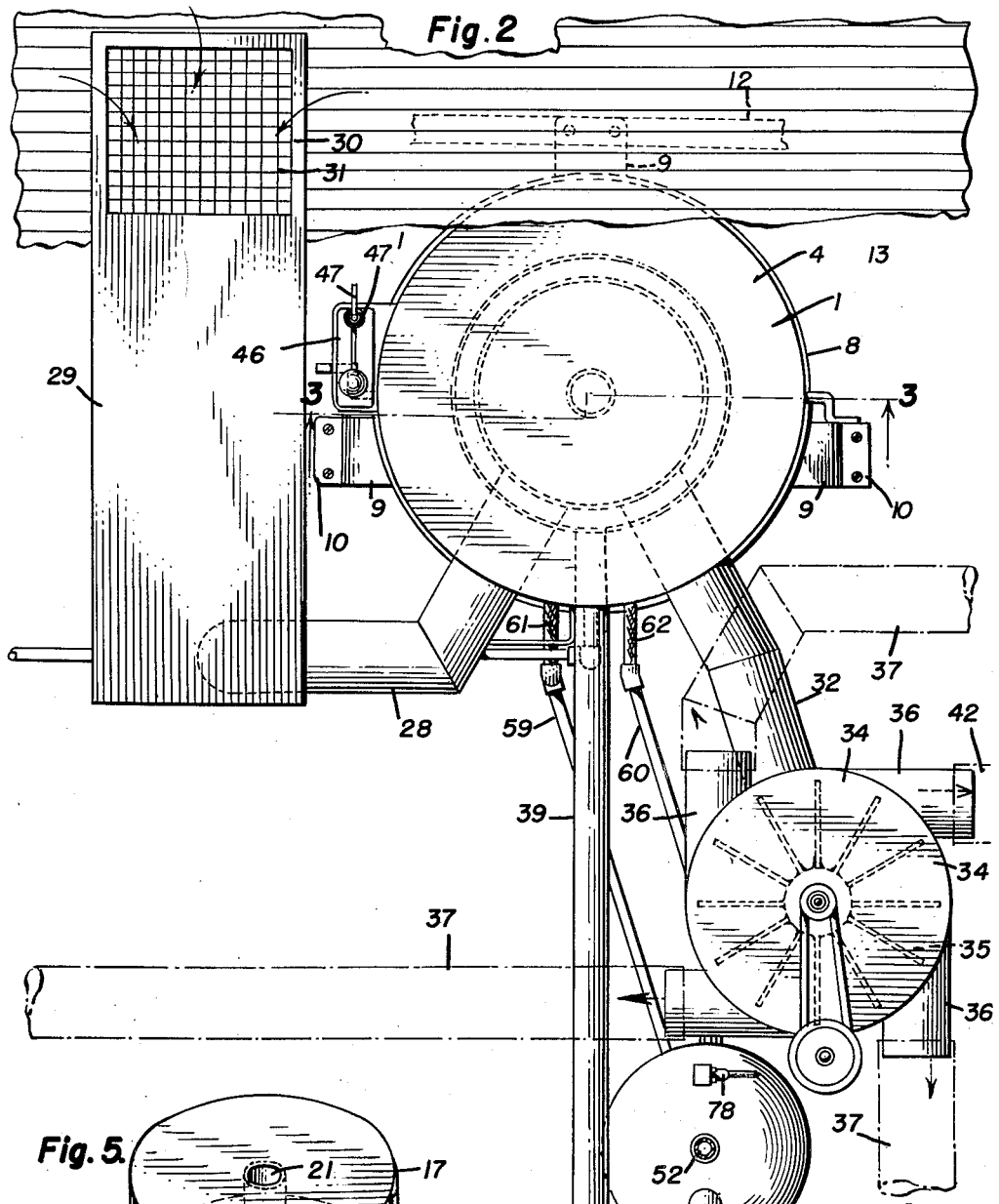
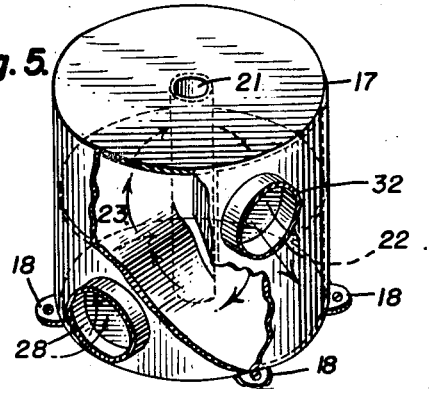

Nov. 27, 1951 D. B. KOSER 2,576,719
GAS BURNING AIR AND WATER HEATING
FURNACE WITH THERMOSTATIC CONTROL
Filed Jan. 21, 1947 3 Sheets-Sheet 3

Inventor
Dellie B. Koser

By Clarence A. O'Brien
and Harvey B. Jackson
Attorneys

Patented Nov. 27, 1951

2,576,719

UNITED STATES PATENT OFFICE 2,576,719

GAS-BURNING AIR- AND WATER-HEATING FURNACE WITH THERMOSTATIC CONTROL

Dellie B. Koser, Detroit, Mich.

Application January 21, 1947, Serial No. 723,237

5 Claims. (Cl. 126—101)

My invention relates to improvements in gas burning hot air furnaces for dwellings, and the like.

The invention is designed with the primary object in view of providing an efficient, safe, hot air heating equipment for ceiling installation in the cellars of small dwellings especially, and embodying means for heating air under forced draft and distributing the heated air through a number of pipes at a higher velocity and higher temperature than can be obtained with hot air furnaces as commonly constructed.

Another object is to provide in a furnace, of the type above indicated, for heating by gas a large volume of air in a comparatively small heating chamber and without danger of explosion in the furnace.

Another object is to provide in such a furnace for heating hot water in the usual hot water service boiler without impairing the efficiency of the furnace as regards output of hot air.

Still another object is to provide gas burning hot air furnace equipment which is easy and inexpensive to install, and manufacture, and will not readily get out of order.

Other and subordinate objects, also comprehended by my invention, together with the precise nature of my improvements, and the advantages thereof will be readily understood when the succeeding description and claims are read with reference to the drawings accompanying and forming part of this specification.

In said drawings:

Figure 1 is a view in inverted perspective of my invention in a preferred embodiment thereof;

Figure 2 is a view in plan with the floor partly broken away;

Figure 3:
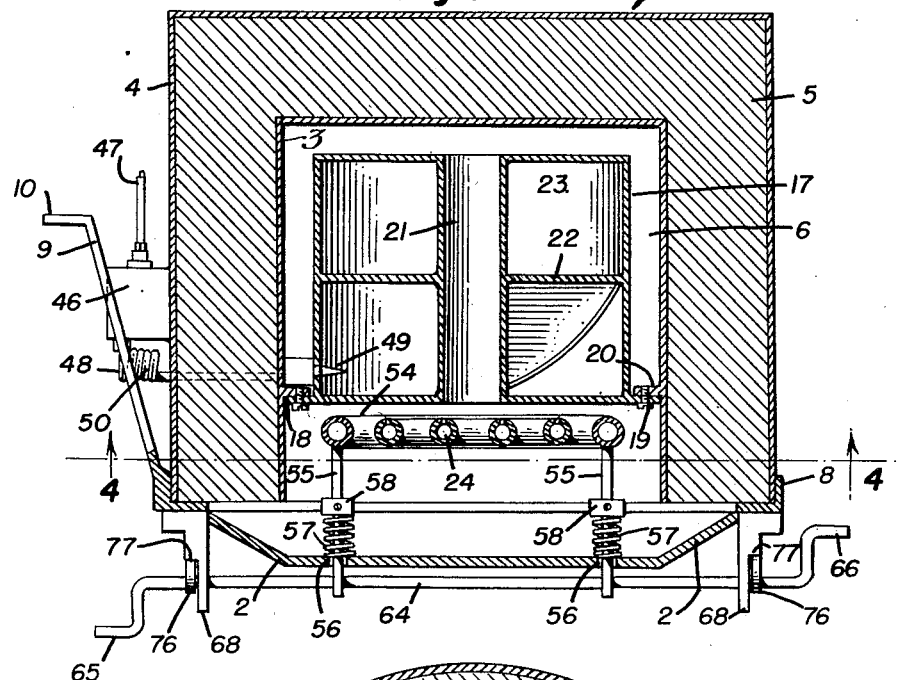
Figure 3 is a view in vertical transverse section taken on the line 3—3 of Figure 2 and drawn to a larger scale.
Figure 4:
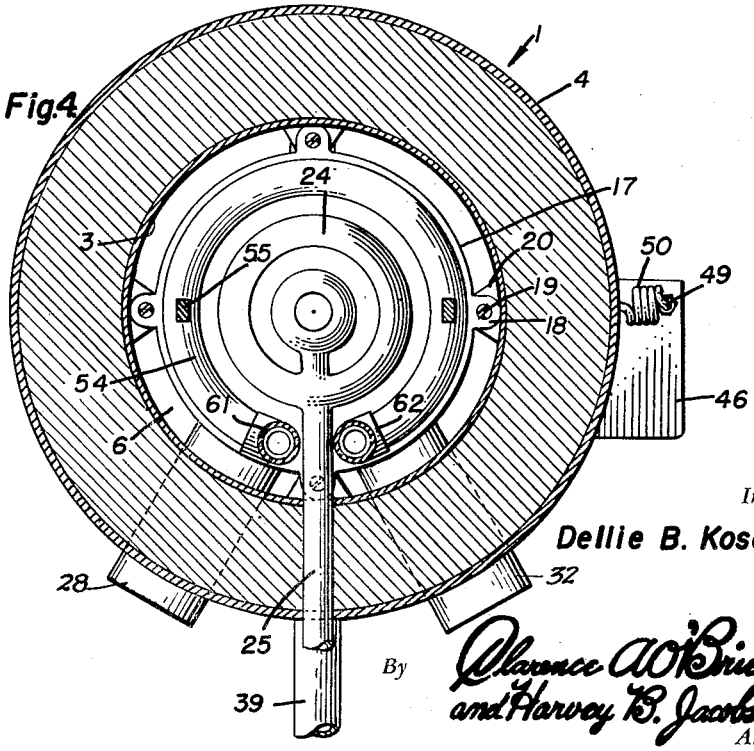
Figure 4 is a view in horizontal section taken on the line 4—4 of Figure 3; and, Figure 5 is a fragmentary view in perspective of the heating drum and partition plate.

Referring now to the drawings by numerals, my improved furnace, in the illustrated, preferred embodiment thereof comprises, as its basic element a casing 1 which is of inverted cup-like form, and preferably cylindrical in cross section, with a bottom end closed by a dished circular bottom plate 2 in a manner presently clear. The casing 1 comprises a pair of inner and outer cylindrical, cup-like, shells 3, 4 spaced apart concentrically with suitable insulation 5 therebetween. As will be apparent, the casing 1 and the bottom plate 2 form a combustion chamber 6 in the casing 1 closed with the exceptions presently seen.

A metal hanger bracket 7 is provided for the casing 1 comprising an annulus 8 of right angle cross section and in which the bottom of the casing 1 is adapted to seat at the outer corner edge of said bottom. The annulus 8 is provided with circumferentially spaced upwardly and outwardly inclined hanger arms 9, each with a terminal flange 10. The described hanger bracket 7 is designed for attachment to adjacent joists 11, and to a cross joist 12, of a floor 13 and by means of screws 14 passing through the flanges 10 into said joists, whereby said casing is supported at the ceiling as will be clear. Screws 15 passing through edge ears 16 in the bottom plate 2 fasten said plate in place.

A relatively smaller heating drum 17 of sheet metal, preferably, is mounted in the combustion chamber 6 and spaced equidistantly from the top and sides of said chamber by bottom edge lugs 18 on said drum bolted, as at 19, to lugs 20 extending radially from the inner shell 3. The bottom of the heating drum 17 is spaced above the bottom end of the casing 1 for a purpose presently apparent. The heating drum 17 comprises an axial, upright, tubular flue 21 extending through said drum, and a partition plate 22 in said drum of substantially spiral form with two convolutions forming in said drum 17 a spiral, annular, heating chamber 23 around flue 21.

A gas burner 24 of annular form is provided below the heating drum 17 with a gas feed pipe 25 extending outwardly of the casing 1 and anchored therein, whereby said burner is fixed in the combustion chamber 6 concentrically of the same and in a horizontal position. The gas feed pipe 25 may be extended outside the casing 1 in any suitable manner to a source of gas supply, not shown, and is provided with the usual control and shut-off cocks 26, 27.

A cold air supply pipe 28 extends through the casing 1, and combustion chamber 6, into the heating drum 17 below the partition plate 22 and to one end of a cold air downtake box 29 suitably secured between adjacent joists 11 with a cold air downtake opening 30 in the other end thereof registering with a grid 31 suitably fixed in the floor 13.

A hot air output pipe 32 extends from the heating drum 17, and heating chamber 23, from above the partition plate 22 and closely adjacent the cold air supply pipe 28. The outer end of the hot air output pipe 32 is suitably connected to the smaller end of an upwardly flaring air intake extension 33 on the bottom of a horizontally disposed, circular, air distributing drum 34 in which a suction and blower fan 35 is mounted for rotation about a vertical axis. The distributing drum 34 is designed to be suspended from the joists 11 of the floor 13 by any suitable means, not shown. Hot air discharge nipples 36 extend from the circumferential portion of the air distributing drum 34 tangentially in spaced relation around said drum. The hot air discharge nipples 36 are designed to be connected to hot air pipes 37, shown in broken lines in Figure 3, and adapted for discharging hot air into different rooms, not shown. A suitably mounted motor 38 is provided for driving the fan 35 through a belt and pulley drive 38'.

A suitable chimney flue pipe 39 extends from one side of the casing 1 from the upper portion of the combustion chamber 6 for carrying off products of combustion in the usual manner.

A gravity feed tank 46 is provided at one side of the casing 1 and suitably fixed thereto with a feed pipe 47 therein connected to a water supply source under pressure, not shown, said tank being provided with a float valve 47 therein for controlling the feed through said pipe 47. A water discharge pipe 48 extends from the bottom of said tank 46 through the casing 1, combustion chamber 6, and heating drum 17 into the heating chamber 23 and terminates in a spray nozzle 49 in said chamber. The tank 46 is designed to feed water in spray form into the heating chamber 23 for humidifying purposes. The discharge pipe 48 is coiled, as at 50, to form a back pressure trap between the spray nozzle 49 and said tank 46.

The described furnace is adapted for heating hot water in the usual domestic hot water storage tank 51 having the usual cold water inlet line 52 and the hot water discharge line 53. For this purpose means are provided as follows.

A loop-like pipe forming a hot water back 54 is mounted in the combustion chamber 6 in surrounding concentric relation to the gas burner 24 by uprights 55 depending from said water back through guide openings 56 in the bottom plate 2 and providing for vertical adjustment of said water back 54 for a purpose presently seen. Coil springs 57 surrounding the uprights 55, and interposed between the bottom plate 2 and set collars 58 on said uprights yieldingly urge the water back 54 upwardly. A cold water feed line 59 extends from the bottom of the storage tank 51 to one end of the hot water back 54. A hot water return line 60 extends from the other end of the hot water back 54 to a suitable point on the storage tank 51. The said lines 59, 60 are provided with terminal, flexible, hose sections 61, 62 extended into the combustion chamber 6 through an opening 63 in the bottom plate 2. The flexible hose sections 61, 62 provide for vertical adjustment of the hot water back 54 relative to said lines 59, 60 in a manner which will be clear.

As in the case of the usual hot water coil, water is circulated through the water back 54 by siphoning action of the water in the storage tank 51.

Thermostatically controlled means are provided for adjusting the water back 54 vertically to vary the spacing of the same from the gas burner 24 in accordance with the temperature of the water in the storage tank 51, so that said storage tank will not become overheated, said means being described in the following.

A rotary shaft 64 extends across the bottom plate 2, horizontally, with oppositely turned end cranks 65, 66 thereon. The shaft 64 is journaled in the lower ends of the uprights 55 and is extended through vertical guide slots 67 in the pair of guide arms 68 depending from the annulus 8 of the hanger bracket 7 at opposite sides of said annulus. The guide slots 67 provide for vertical play of the shaft 64 bodily in the guide arms 68. At a suitable point, preferably between floor joists 11, the usual thermostatically controlled motor 69, of commerce, is provided and which is of the type embodying an oscillating motor shaft 70 with oppositely turned end cranks 71, 72 thereon. A pair of pull chains 73, 74, one of which is trained under suitably mounted pulleys 75, operatively connect the cranks 71, 72 to the cranks 65, 66, so that rotary oscillation of the motor shaft 70 in opposite directions correspondingly rotates the shaft 64. A pair of cams 76 fast on the shaft 64 and engaging overhanging shoulders 77 on the guide arms 68 co-act with said shoulders when the shaft 64 is rotated in the proper directions to lower the water back 54 in opposition to the coil springs 57. A thermostat 78, of any suitable type, on the storage tank 51 and wired, in any suitable manner, to the motor 69 controls said motor in the usual manner well known in the art. Normally, when the storage tank 51 is hot, the motor 69 operates to cause the cams 76 and shoulders 77 to rotate the shaft 64 in a direction to lower the water back 54 and increase the distance between the same and the gas burner 24, thus reducing the heat transfer between said burner and water back. When the water in the storage tank 51 is cold, said motor 69 operates, under control of the thermostat 78 to rotate the shaft 64 in a direction such that the springs 57 function to elevate the water back 54 to the bottom of the heating drum 70 in surrounding relation to the flame, not shown, issuing from the gas burner 24, the flame being deflected by the bottom of the heating drum 17 to said water back 54.

The operation of the described furnace, otherwise than as described, will be readily understood. The fan 35 operates to draw hot air out of the heating chamber 23, the suction thus created drawing cold air into said chamber through the cold air intake box 29 and the cold air supply pipe 28. At the same time, the hot air drawn out of the heating chamber 23 is forced by said fan 35 out of the distributing drum 34 and nipples 36 into and through the heating pipes 37. The suction created in the heating chamber 23, together with the spiral partition plate 22, causes the hot air to swirl around said chamber as heat transfer takes place between the gas burner 24 and the heating drum 17, the hot air in said chamber circulating around the same substantially twice so that it is thereby heated to a hot temperature. The products of combustion in the combustion chamber 6 pass out of the chimney flue pipe 39 in the usual manner.

The foregoing will, it is believed, suffice to impart a clear understanding of my invention, without further explanation.

Manifestly, modifications in the invention described, both as regards structural details and combinations of parts, may be resorted to without departing from the inventive concept, and right is herein reserved to such modifications as fall within the scope of the appended claims.

What I claim is:

1. In a furnace of the class described, a casing forming a combustion chamber, a gas burner in the bottom of said chamber, means in said chamber above said burner for deflecting flame issuing from the burner laterally of the burner, a hot water storage tank, a hot water back in said combustion chamber in surrounding relation to said burner and connected to said tank, means supporting said water back for vertical adjustment toward and away from the deflected flame, temperature responsive means responsive to variations in the temperature of the water in said tank, and means operatively associated with and under control of said temperature responsive means to adjust said water back vertically toward the deflected flame when the temperature in said tank decreases and away from said flame when the temperature in said tank increases.

2. In a furnace of the class described, a casing forming a combustion chamber, a gas burner in the bottom of said chamber, means in said chamber above said burner for deflecting flame issuing from the burner laterally of the burner, a hot water storage tank, a hot water back in said combustion chamber in surrounding relation to said burner and connected to said tank, means supporting said water back for vertical adjustment toward and away from the deflected flame, temperature responsive means responsive to variations in the temperature of the water in the tank, and means operatively associated with and under control of the temperature responsive means to adjust said water back vertically toward the deflected flame when the temperature in said tank decreases and away from said flame when the temperature in said tank increases comprising a rotary horizontal shaft mounted for vertical adjustment bodily and connected to said water back for vertical adjustment of the water back with the shaft, means for rotating said shaft, and means for adjusting said shaft vertically by rotation thereof.

3. In a furnace of the class described, a casing forming a combustion chamber, a gas burner in the bottom of said chamber, means in said chamber above said burner for deflecting flame issuing from the burner laterally of the burner, a hot water storage tank, a hot water back in said combustion chamber in surrounding relation to said burner and connected to said tank, means supporting said water back for vertical adjustment toward and from the deflected flame, temperature responsive means responsive to variations in temperature of the water in said tank, and means operatively associated with and under control of said temperature responsive means to adjust said water back vertically toward the deflected flame when the temperature in said tank decreases and away from said flame when the temperature in said tank increases comprising a rotary horizontal shaft mounted for vertical adjustment bodily, means connecting said shaft to said water back for vertical adjustment of said water back with said shaft and spring tensioned to adjust the shaft and the water back upwardly, cam means operative by rotation of said shaft to adjust said shaft downwardly to correspondingly adjust the water back, and means for rotating said shaft.

4. In combination, a gas burner, means above said burner for deflecting flame issuing therefrom laterally of the burner, a hot water storage tank, a hot water back in surrounding relation to said burner and connected to said storage tank, means supporting said water back for vertical adjustment toward and away from the deflected flame, temperature responsive means responsive to variations in the temperature of the water in said tank, and means operatively associated with and under control of said temperature responsive means to adjust said water back vertically toward the deflected flame when the temperature in said tank decreases and away from said flame when the temperature in said tank increases.

5. In apparatus of the class described, a combustion chamber, a fuel burner in the bottom of said chamber, an annular hot water back surrounding said burner, a heating drum in said chamber having its bottom spaced close to said burner and water back to radiate heat downwardly toward said water back and deflect the flame from said burner laterally toward said water back, a hot water storage tank to which said water back is connected, means supporting said water back for vertical adjustment toward and from the deflected flame, temperature responsive means responsive to variations in temperature of the water in said tank, means operatively associated with and under control of said temperature responsive means to adjust said water back vertically toward the flame and the bottom of the drum when the temperature in the tank decreases and away from said flame and the bottom of the drum when the temperature in the tank increases, and means for passing atmospheric air through said drum to be heated therein.

DELLIE B. KOSER.

REFERENCES CITED

The following references are of record in the file of this patent:

UNITED STATES PATENTS

| Number | Name | Date |
| --- | --- | --- |
| 262,558 | Barry | Aug. 15, 1882 |
| 577,695 | Smith | Feb. 23, 1897 |
| 640,778 | Korthauer | Jan. 9, 1900 |
| 1,404,365 | Hackman | Jan. 24, 1922 |
| 1,505,729 | Robertshaw | Aug. 19, 1924 |
| 1,974,816 | Johnson | Sept. 25, 1934 |
| 2,158,338 | Rock | May 16, 1939 |
| 2,278,683 | Zolik | Apr. 7, 1942 |
| 2,324,540 | Ryden | July 20, 1943 |
| 2,387,022 | Hess | Oct. 16, 1945 |